United States Patent
Heeren et al.

[19]

[11] Patent Number: 6,078,158
[45] Date of Patent: Jun. 20, 2000

[54] DISK DRIVE MOTOR SPIN-UP CONTROL

[75] Inventors: Scott E. Heeren, San Jose; Neal Bertram Schirle; Daniel R. Stacer, both of Morgan Hill, all of Calif.

[73] Assignee: International Business Machines Corporation, Armonk, N.Y.

[21] Appl. No.: 09/205,390

[22] Filed: Dec. 4, 1998

[51] Int. Cl.$^7$ ................ H02P 1/04; H02P 1/26; H02P 5/28; G11B 15/46
[52] U.S. Cl. ............ 318/430; 318/778; 318/798; 318/806; 318/809; 318/439; 318/473; 360/73.03
[58] Field of Search .................. 318/700, 720–724, 318/729, 778, 798–802, 806–811, 430, 431, 438, 254, 439, 138, 471–473; 360/73.01, 73.03

[56] References Cited

U.S. PATENT DOCUMENTS

| | | | |
|---|---|---|---|
| 3,908,130 | 9/1975 | Lafuze | 290/46 |
| 4,835,448 | 5/1989 | Dishner et al. | 318/254 |
| 5,097,189 | 3/1992 | Ito et al. | 318/685 |
| 5,268,627 | 12/1993 | Baik et al. | 318/778 |
| 5,436,544 | 7/1995 | Matsubara et al. | 318/719 |
| 5,466,999 | 11/1995 | Hutsell | 318/431 |
| 5,471,353 | 11/1995 | Codilian et al. | 360/73.03 |
| 5,777,447 | 7/1998 | Okano | 318/434 |
| 5,986,419 | 11/1999 | Archer et al. | 318/254 |

OTHER PUBLICATIONS

D.F. Glaess et al., "Variable Torque Constant Motor Drive", Feb. 1996, *IBM Technical Disclosure Bulletin,* vol. 39, No. 02, pp. 149–150.

*Primary Examiner*—Brian Sircus
*Attorney, Agent, or Firm*—Heller Ehrman; White & McAuliffe

[57] ABSTRACT

A motor control processor controls motor spin-up in a disk drive by detecting environmental temperature at the spindle motor of the disk drive, controlling commutation phase advance to generate substantially maximum torque if the detected environmental temperature indicates that maximum torque is needed, and adjusts the commutation phase advance for optimal efficiency after the maximum torque is no longer needed. Following motor start and reaching operational speed, the motor is operated in a steady-state maximum operating efficiency mode unless sensed environmental temperature indicates that maximum torque, rather than maximum efficiency, is needed. The system determines that the need for maximum torque has passed either when a predetermined time interval after motor start expires or by repeatedly polling motor temperature information.

24 Claims, 7 Drawing Sheets

DISK DRIVE MOTOR SPIN-UP CONTROL

BACKGROUND OF THE INVENTION

1. Field of the Invention

This invention relates generally to control of polyphase motors and, more particularly, to spin-up and speed control of disk drive spindle motors.

2. Description of the Related Art

Rotating direct access storage devices (DASDs), such as magnetic disk drives, are popularly used for storage and retrieval of recorded digital information in computers. The digital information comprises data that is read from or written to a circular, relatively rigid disk. The disk is rotated about a spindle by a spindle motor. As the disk is spun, a servomechanism of the DASD positions a transducer across the surface of the disk. The transducer comprises a magnetic head that can sense the digital information recorded on the disk surface. The digital information is recorded on the disk in a series of concentric tracks, and the servomechanism moves the transducer to a desired track in a data seek operation, while making the very minute movements necessary to maintain the transducer centered over a desired track in a track following operation. A DASD may incorporate more than one disk, and the DASD may also include multiple heads, one for each disk of the DASD.

The digital information stored on the DASD can include programming code that implements an operating system of the computer associated with the DASD. It is necessary to load the programming code into memory and execute the operating system in an initialization or "boot-up" sequence when the computer is first turned on. Hence, when power is initially applied to the computer and the DASD, the spindle motor of the DASD undergoes "spin-up" to bring the disk up to operating speed and permit the reading of the operating system programming code. Often, the disk will remain spinning for as long as the computer is turned on, and some users leave their computers turned on for extended periods of time. The DASDs in most computers, however, are typically shut down after a period of non-use, even if power continues to be applied, to conserve energy and improve efficiency. The DASD spindle motor then spins up at the next disk access of data.

Thus, there are many occasions on which spindle motors must quickly come up to a steady-state operating speed, which for a server class DASD is presently on the order of 10,000 revolutions per minute (RPM). Other computer drives may have somewhat slower speeds. Such rapid accelerations may occur under a wide variety of environmental conditions, particularly for laptop and notebook computers. For example, laptop and notebook computers may be exposed to a relatively wide range of temperature extremes. Access times for retrieving or recording data from the disk are measured on the order of milliseconds. Therefore, it is critical that disk spindle motors have the ability to quickly come up to operating speed under a wide variety of conditions. In addition to the requirement for fast acceleration, the drives must immediately maintain the desired speed within tightly specified tolerance values to the read and write data.

The spindle motor of a DASD is typically constructed as a brushless three-phase inductive motor. A three-phase motor is typically constructed with a rotating magnet assembly, or spindle, and a stationary coil assembly, also called the field or stator. The coil assembly is also referred to as the armature, and includes multiple inductive coils. An alternating current (AC) supplied to the coils creates a force that rotates the spindle.

At any time, current is being supplied to two of the three phases, or coils, by applying a voltage across two of the three (externally accessible) terminals. The third terminal is left floating, and therefore the voltage seen on this third terminal is simply the voltage induced by the movement of the rotating magnets relative to the coil—a sinusoidal voltage signal called the electro-magneto force, or BEMF. Current is applied to the motor windings in the manner described above in six different configurations, or states. There exist six states because there are three terminals and two polarities of current direction for each pair of coil terminals. The motor is driven by sequencing repeatedly through these six states. A commutation is the act of switching from one state to another. An "upper" commutation is one in which the terminal previously driven with high voltage is allowed to float, and the terminal previously left floating is now driven with high voltage. A "lower" commutation is one in which the terminal previously driven with low voltage is allowed to float, and the terminal previously left floating is now driven with low voltage. The six-state sequence alternates between upper and lower commutations.

The timing of the commutation for a motor phase is expressed in electrical degrees relative to the BEMF, and is an indicator of motor operating efficiency. For maximum efficiency, the windings of a phase should be driven symmetrically with respect to the BEMF waveform for that phase. For example, for a given phase, one upper commutation will begin driving current through that phase. The next consecutive upper commutation will stop driving that phase and allow it to float. For maximum efficiency, these two commutations should occur equidistant (in electrical degrees) from the maximum value of the corresponding BEMF waveform for that phase.

Motor efficiency also is indicated by the torque constant, represented as $K_t$ and specified in Newton-meters per amp. The greater the $K_t$, the more efficient the motor. That is, the $K_t$ value represents the torque obtained given a unit current input. The torque constant $K_t$ is generally a function of the number of stator windings and the strength of the magnets within the rotor. Thus, a greater $K_t$ value indicates more output torque per input current and therefore indicates greater efficiency. Unfortunately, for a greater $K_t$ value, there is less voltage headroom for the drive currents. The motor voltage headroom is an indicator of the current reserve that can be called upon to deliver needed current to the field windings should there be an increased demand for output, or torque. Voltage headroom is also a function of power supply voltage, motor winding resistance, and motor-driver circuit resistance.

Voltage headroom is desired for a motor because, for example, there is an increased demand for torque at motor start-up, especially at relatively cold operating temperatures. The increased torque demand occurs because, for example, grease around the spindle shaft will thicken at colder temperatures and tend to clump, resisting smooth, fluid movement. This type of grease slump around the spindle shaft will increase drag on the motor spindle and require greater torque output than ordinary to get the motor to its steady-state operating speed, as well as to maintain that speed precisely. The severity of the grease slump will vary with environmental temperature and elapsed time since motor start. As noted above, this variation generally will be more pronounced, and more debilitating, in the case of laptop and notebook computers. For all computer applications, this variation in slumping will be most critical at disk drive start-up.

From the discussion above, it should be apparent that there is a need for a disk drive motor that has a high operating efficiency to minimize power consumption and that can deliver the increased torque required at disk drive start-up and under certain operating conditions. The present invention fulfills this need.

SUMMARY OF THE INVENTION

The present invention provides a motor control system that controls motor spin-up in a disk drive by detecting environmental temperature at the spindle motor of the disk drive, controlling commutation phase advance to generate substantially maximum torque if the detected environmental temperature indicates that maximum torque is needed, and adjusts the commutation phase advance for optimal efficiency after the maximum torque is no longer needed. The invention recognizes that the motor torque constant is fixed by physical parameters, the effective torque constant of a motor can be reduced by driving the motor out of phase, by either advancing or delaying the commutation timing from the optimal timing at a given speed. This permits driving with higher current, because the BEMF is lower with the shifted commutation, and the higher current overcomes greater drag. Thus, the motor is accelerated to operational speed and then operates in a steady-state maximum operating efficiency mode, unless sensed environmental temperature indicates that maximum torque, rather than maximum efficiency, is needed. Such maximum torque requirements are typically the case, for example, at motor spin-up with cold environmental temperatures. The steady-state high efficiency mode of operation is implemented once the need for maximum torque has passed. In this way, maximum efficiency is achieved when warranted, and increased torque output is provided when conditions demand it.

In one aspect of the invention, the system determines that the need for maximum torque has passed when a predetermined time interval has expired after motor start. Thus, efficient operation is implemented a predetermined time after initial motor start. In an alternative embodiment, the need for maximum torque is determined to have passed, and efficient operation is implemented, directly in response to sensed environmental temperature. The system preferably controls motor torque by changing the commutation phase advance to the field windings. In another aspect of the invention, the commutation phase advance of the motor is controlled as the motor accelerates to provide for the fastest possible spin-up to the target operating speed. This can be carried out regardless of temperature and is performed as follows: first, the spindle motor's phase advance should be maintained for optimal efficiency (driving symmetrically, or "in phase" with the BEMF waveform) until the motor reaches a speed at which the available current becomes smaller than the commanded current. This decrease in the amount of available current is due to the increase in magnitude of the BEMF as speed increases, which in turn diminishes the voltage headroom margin. When the voltage headroom for a given commanded current is used up, we can say we've reached the "current-limiting" speed. Obviously, this speed will depend on a number of factors: motor $K_t$, motor and driver circuit resistance, and power supply voltage. The current-limiting speed can be estimated based on nominal values; alternatively it can be detected in real time using a feedback current loop which compares commanded current with the current actually being delivered. When the actual current drops below the commanded current, we know we've reached the "current-limiting" speed. After this point in the acceleration profile, available current will continue to decrease until the target (operating) speed is reached. Over this range, the motor phase advance should be increased gradually to maximize available current, and thus maximize output motor torque. The result will be the fastest achievable spin-up time. Upon reaching speed, the temperature-dependent phase advance selection can be employed as previously discussed.

Other features and advantages of the present invention should be apparent from the following description of the preferred embodiments, which illustrate, by way of example, the principles of the invention.

DESCRIPTION OF THE PREFERRED EMBODIMENTS

Figure 1:
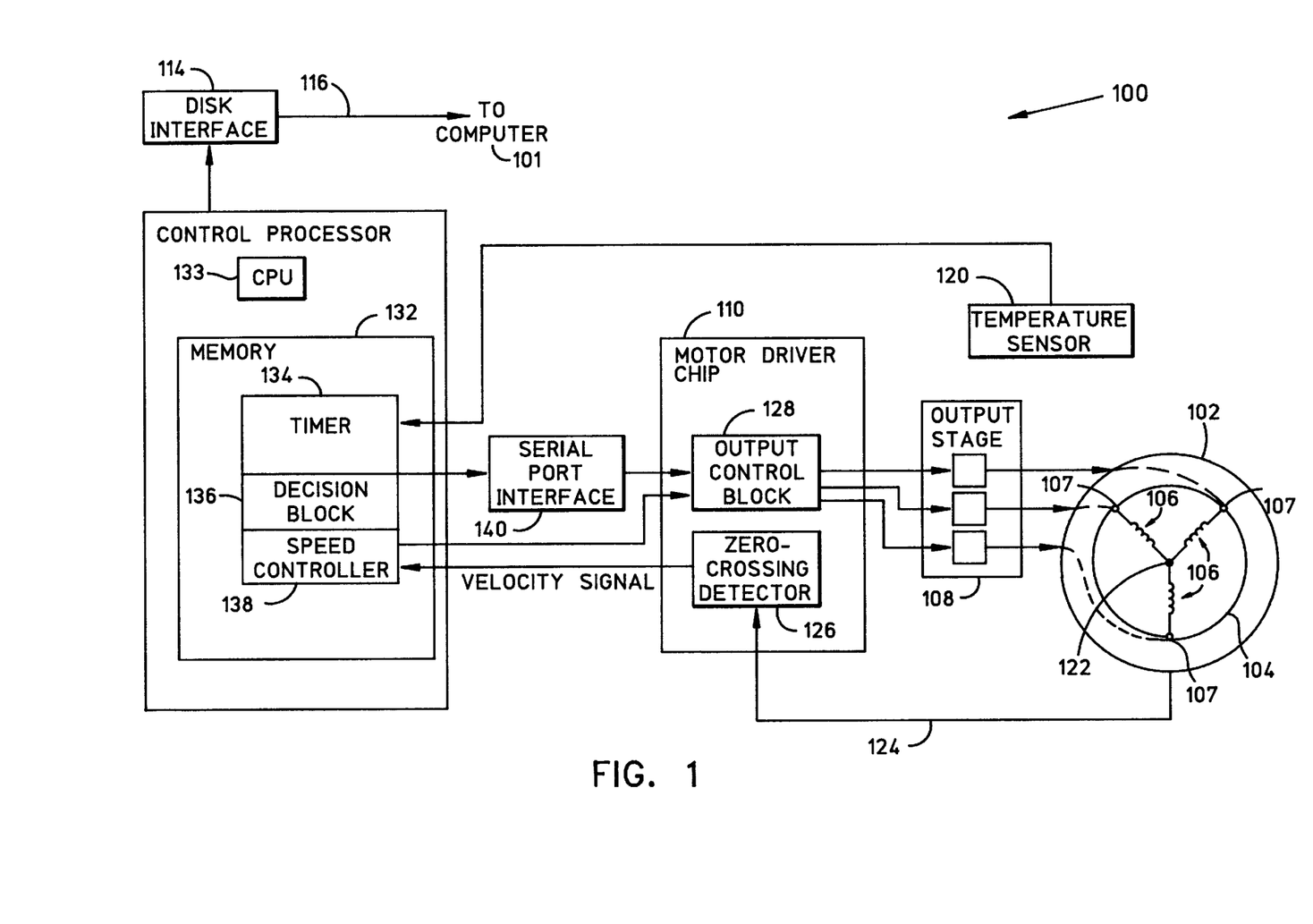
FIG. 1 is a block diagram representation of the relevant components of a direct access storage device (DASD) disk drive system constructed in accordance with the present invention.

FIG. 1 illustrates an exemplary direct access storage device (DASD) 100, such as a magnetic disk drive, constructed in accordance with the present invention. The DASD stores data received from, and provides data back to, an associated computer 101. One or more magnetic media platters, or disks 102, are rotated by a spindle motor 104. Field windings 106 of the spindle motor with terminals 107 are driven with current from an output stage 108 in response to drive signals from a motor driver chip 110. The motor driver chip operates under control of a microprocessor/digital signal processor 112 (hereafter, "control processor"). A disk drive interface 114 permits communication of the control processor with a computer control bus 116, over which the control processor receives data that indicates when a disk access is desired. The motor driver chip 110 can be of conventional design, such as one of the type manufactured by Celestica, Inc. The driver chip of the preferred embodiment has an externally selectable commutation delay value, as described further below.

The control processor 112 implements programming steps to control motor spin-up in the disk drive 100 by detecting environmental temperature at the spindle motor 104 using a temperature sensor 120. Motor spin-up as used herein refers to acceleration of the spindle motor 104 from motor start until the motor reaches a steady-state operational speed. In a typical server class disk drive, that operation speed is presently 10,000 RPM. The temperature sensor is shown in FIG. 1 offset from the motor 104 for illustration only. The sensor is preferably positioned near the spindle motor hub or shaft, to most accurately indicate internal motor temperature. Motor speed sensing is performed in a conventional manner, by detecting BEMF signals comprising voltage output from the motor center tap 122 and voltage taps from each of the winding terminals 107. In the preferred embodiment, the motor 104 is a three-phase, eight-pole induction motor. It should be understood that the principles of the invention are equally applicable to other motors, regardless of the number of poles. The BEMF signals are provided over sensing lines 124 to a zero-crossing detector 126 of the motor driver chip 110. The zero-crossing detector indicates zero-crossings of the BEMF signals and thereby provides motion feedback information, as well as determining when motor commutations should occur. In the preferred embodiment, for example, rotation of the spindle shaft produces four sinusoidal cycles on each phase coil per shaft revolution. The zero-crossing detector compares the BEMF waveform with the center tap voltage to produce a velocity motion feedback signal, which is a digital signal indicative of motor speed, that is provided to the control processor 112. A speed control signal is produced from the control processor and is delivered to an output control block 128 of the motor driver chip 110. The output control block also receives a phase advance select signal from the control processor 112, which determines the phase advance (if any) with which the motor will be driven.

The control processor 112 includes a memory 132 in which programming steps are stored. These programming steps are executed by a central processor unit (CPU) 133 of the control processor to implement a controller that includes a timer 134, an operation mode selector 136, and a spindle speed controller 138. In general, the control processor maintains accurate spindle speed control by monitoring the velocity feedback signal provided by the motor driver chip zero-crossing detector, and by adjusting the commanded output current value (via a digital-to-analog converter (DAC) setting) to correct for variations from the desired speed. In the event that sufficient current is not available to maintain accurate control, such as in low temperature, high drag cases, the controller can increase the commutation phase advance to achieve the required current.

The control processor 112 controls the commutation phase advance of the windings 106 to generate substantially maximum torque if the environmental temperature detected by the temperature sensor 120 indicates that maximum torque is needed, and adjusts the commutation phase advance for optimal efficiency after the maximum torque is no longer needed. This permits the optimal drive current to be delivered to the motor windings 106 when increased torque output is desired, and otherwise to deliver the drive current needed for maximum efficiency.

To control the commutation phase advance, the control processor 112 uses the timer block 134 to set a fixed time for implementing the phase advance mode of operation. That is, in the preferred embodiment the high torque mode of operation is continued for a predetermined time interval after operational speed is reached if a cold environmental temperature was detected at motor start. The predetermined time interval is set by the timer block. In controlling the commutation phase advance, the control processor also uses the operation mode selector 136. The mode selector produces an output that represents a decision to implement the phase advance mode or the normal (default) mode. To implement the phase advance mode, the control processor output is a number that represents the number of electrical degrees between the zero crossing of the BEMF signal and the beginning of commutation, for a particular phase. This data is communicated to the motor driver chip 110 through a serial port interface 140. The phase advance data is delivered to the output control block 128, which also receives an output signal from the speed controller 138 to control motor speed. The motor driver chip uses this information to determine the phase advance timing, as will be understood by those skilled in the art. The motor driver chip can be of the type manufactured by Celestica, Inc., or can be one of many other motor driver chips produced by other vendors.

In the preferred embodiment, temperature is detected at motor start and the motor 104 is operated in a maximum torque mode until steady-state operational speed is achieved. For computer disk drives such as used in server computers, steady-state speed typically is on the order of 10,000 RPM. Desktop and notebook or laptop computer drives have slightly slower speeds. Those skilled in the art will appreciate that the teachings of the present invention have application to other fields of use, as well. After steady-state speed is achieved, the detected temperature condition is checked. If no cold condition exists, then the motor is operated at optional efficiency. If a cold condition exists, the commutation phase advance is adjusted to produce maximum torque, for a predetermined amount of time, until the increased torque is no longer needed.

For the preferred embodiment illustrated in FIG. 1, the increased torque is deemed no longer needed after a predetermined time interval has passed following the initial maximum torque output mode. This time interval for maximum torque output has the advantage of being easy to implement, while improving operation and ensuring that efficient operation is restored. In an alternative embodiment described below, the increased torque output may be maintained until the detected temperature is polled and found to be above a threshold value. In either embodiment, the control processor 112 operates the motor 104 in a steady-state maximum efficiency mode unless the sensed environmental temperature indicates that maximum torque, rather than maximum efficiency, is needed. In this way, increased torque output is provided when warranted, and maximum efficiency is otherwise maintained.

Figure 2:
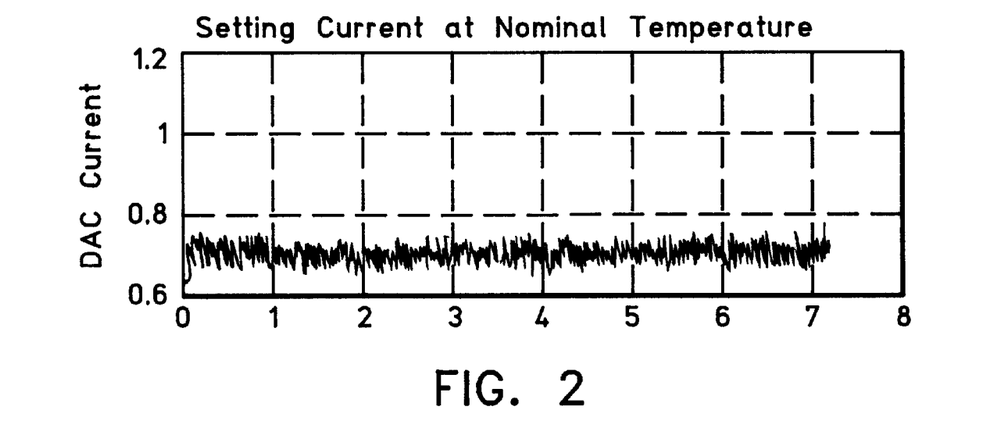
FIG. 2 is a representation of the current supplied to the three-phase drive motor illustrated in FIG. 1 at a nominal (room) operating temperature.
Figure 3:
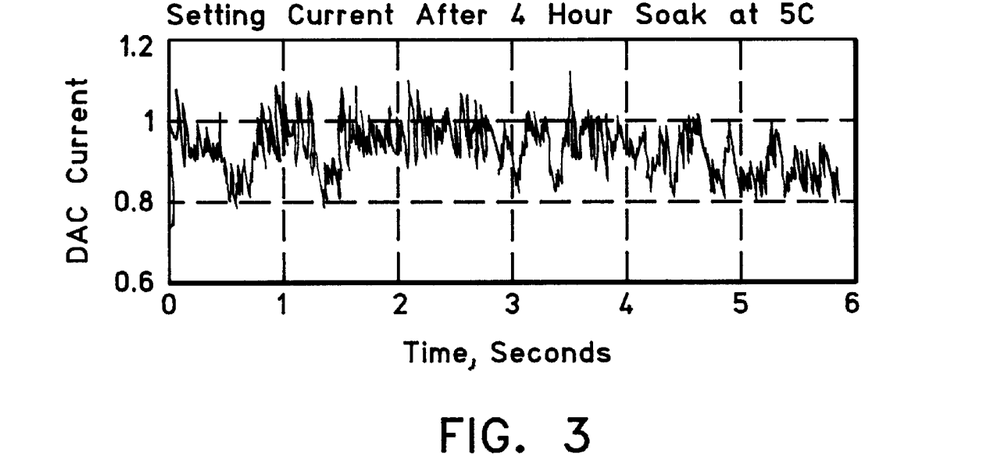
FIG. 3 is a representation of the current supplied to the drive motor illustrated in FIG. 1 after a four-hour cold-soak time period.

The need for varying the drive current, depending on environmental temperature, can be seen by comparing the signal waveforms of FIG. 2 and FIG. 3, which show the current required to maintain spindle speed just after accelerating to the target speed. FIG. 2 is a representation of the drive current at a nominal (room) operating temperature of approximately twenty degrees Centigrade, and FIG. 3 is a representation of the drive current after a four-hour cold-soak at approximately five degrees Centigrade. In both cases, the motor was driven to steady-state operating speed, approximately 10,000 RPM. The motor current in both figures is a representation of the motor current signal that is produced by the driver chip 110 and is delivered to the output stage 108. The output stage can include, for example, six FETs, one connected above each of the three coil terminals and one connected below each of the terminals.

FIG. 2 shows that the drive current required to maintain steady-state motor speed has a nominal value of approximately 0.7 amps, with a relatively tight tolerance of approximately plus or minus 0.025 amps. FIG. 3, the signal needed to maintain steady-state motor speed after a cold soak, shows that the drive current has a nominal value of approximately 0.95 amps, with a relatively broad variance of approximately plus or minus 0.150 amps. The variation in the drive current between FIG. 2 and FIG. 3 illustrates how cold temperature increases the drag on the motor shaft, increasing the drive current needed to maintain steady-state speed.

As noted above, there is a trade-off in motor design specification between power consumption and drive voltage headroom, as represented by the torque constant $K_t$ of the motor. A greater motor torque constant indicates a more efficient motor, but also a motor with decreased voltage headroom. The voltage headroom indicates the amount of drive current that can be supplied to the motor for a given fixed supply voltage. It should be apparent that robust speed control demands sufficient voltage headroom. It traditionally has been necessary to design motors with a lower torque constant $K_t$ than desired, to ensure sufficient voltage headroom for high-drag situations, such as motor spin-up at cold operating temperatures. The solution provided by the invention, generating substantially maximum torque if the motor environmental temperature indicates that maximum torque is needed, and adjusting the commutation phase for optimal efficiency after the maximum torque is no longer needed, is implemented by performing processing steps stored in memory 132 under control of the control processor 112.

Figure 4:
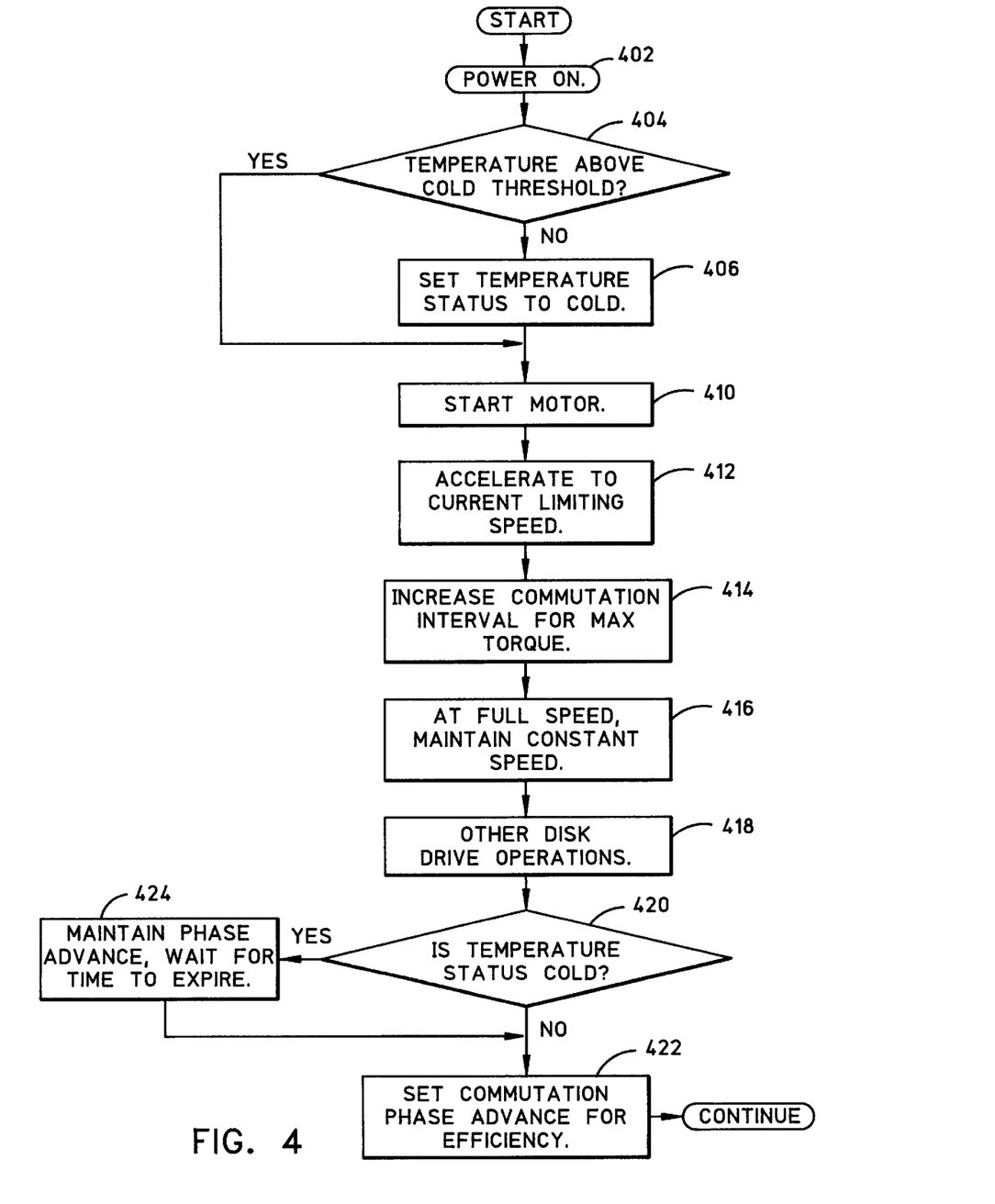
FIG. 4 is a flow diagram that illustrates the processing steps executed by the microprocessor of the disk drive system illustrated in FIG. 1.

FIG. 4 is a flow diagram that illustrates the processing steps performed by the control processor 112. An initial operating step is represented by the "power on" operation box 402, which indicates the beginning of spin-up or the application of power to the associated computer with which the disk drive communicates. At the decision box 404, the control processor receives temperature information from the temperature sensor and checks to determine if a cold threshold has been passed. If the sensed temperature is below a predetermined threshold, a negative outcome at the decision box 404, then temperature status data is set to a "cold" value. This outcome is represented by the flow diagram box numbered 406. If the sensed temperature is above the predetermined threshold, an affirmative outcome at the decision box 404, then the temperature status is not set to "cold"; that is, the default setting is a "normal" environmental temperature.

Motor operation continues at the flow diagram box numbered 410, which indicates that the motor is started. Next, as indicated by the flow diagram box numbered 412, the motor is quickly accelerated to a current-limiting speed. Those who are skilled in the art will recognize that the current-limiting speed is the speed beyond which the power supply cannot deliver the current commanded by the controller. This occurs because the BEMF increases with motor speed, and limits the available drive current due to the limited voltage headroom. In the preferred embodiment, of a three-phase, eight-pole motor, the current-limiting speed occurs at between 6000 RPM and 7000 RPM.

When the current-limiting speed is reached, the control processor begins increasing the commutation phase advance of the drive current to maintain maximum output torque. This ensures a maximum rate of acceleration and is represented in FIG. 4 by the flow diagram box numbered 414. Once full operational speed is reached, in a typical DASD at approximately 10,000 RPM, a closed-loop control mode is entered for constant speed control. This step is by the flow diagram box numbered 416. With the conclusion of acceleration to speed, normal operation conditions would dictate that there no longer is a need for generating increased torque. Those skilled in the art will appreciate that the optimally efficient phase advance to maintain constant speed control is at zero electrical degrees phase advance relative to the BEMF peak value. Other operation of the disk drive can continue at 418 as soon as the target speed is reached. The temperature measurements, waiting for timer to expire, and adjusting commutation delay can be done in parallel with other operations.

The next operating step shown in FIG. 4, represented by the decision box numbered 420, indicates that the control processor checks to determine if the temperature status was set to "cold" following the first decision box 404. That is, the sensed temperature need not be checked again, rather, a previously set status bit is all that needs to be checked. If the temperature status was "normal", a negative outcome at the decision box 420, then the control processor sets the commutation phase advance for the optimal steady-state efficiency and operation continues with closed-loop control at the flow diagram box numbered 422. If the temperature status is "cold", an affirmative outcome at the decision box 420, then the control processor maintains the "maximum torque" mode commutation phase advance for a predetermined time to deliver increased output torque. This step is represented by the flow diagram box numbered 424. It has been determined that a suitable time interval is approximately 5.0 minutes. It should be understood, however, that the length of the suitable time interval can vary greatly, depending on the motor design. After the expiration of the predetermined time interval, normal operation continues with the closed loop control to maintain optimal efficiency and constant speed (box 422).

As noted above, the invention recognizes that the effective motor torque constant can be reduced by driving the motor out of phase, by changing the commutation timing from the optimal timing advance at a given speed, thereby permitting driving with higher current and overcoming greater drag. It should be understood that motor efficiency is reduced somewhat, drive current is supplied over a time interval that is offset from the interval of maximum torque potential. Nevertheless, a greater advantage is gained in that the motor can be driven with higher current, because at the offset time interval the BEMF is lower. The result is a net increase in torque potential. The voltages produced by each of the motor phases are illustrated in FIG. 5 and FIG. 6, and the advantages obtained from the invention are illustrated in FIG. 7.

Figure 5:
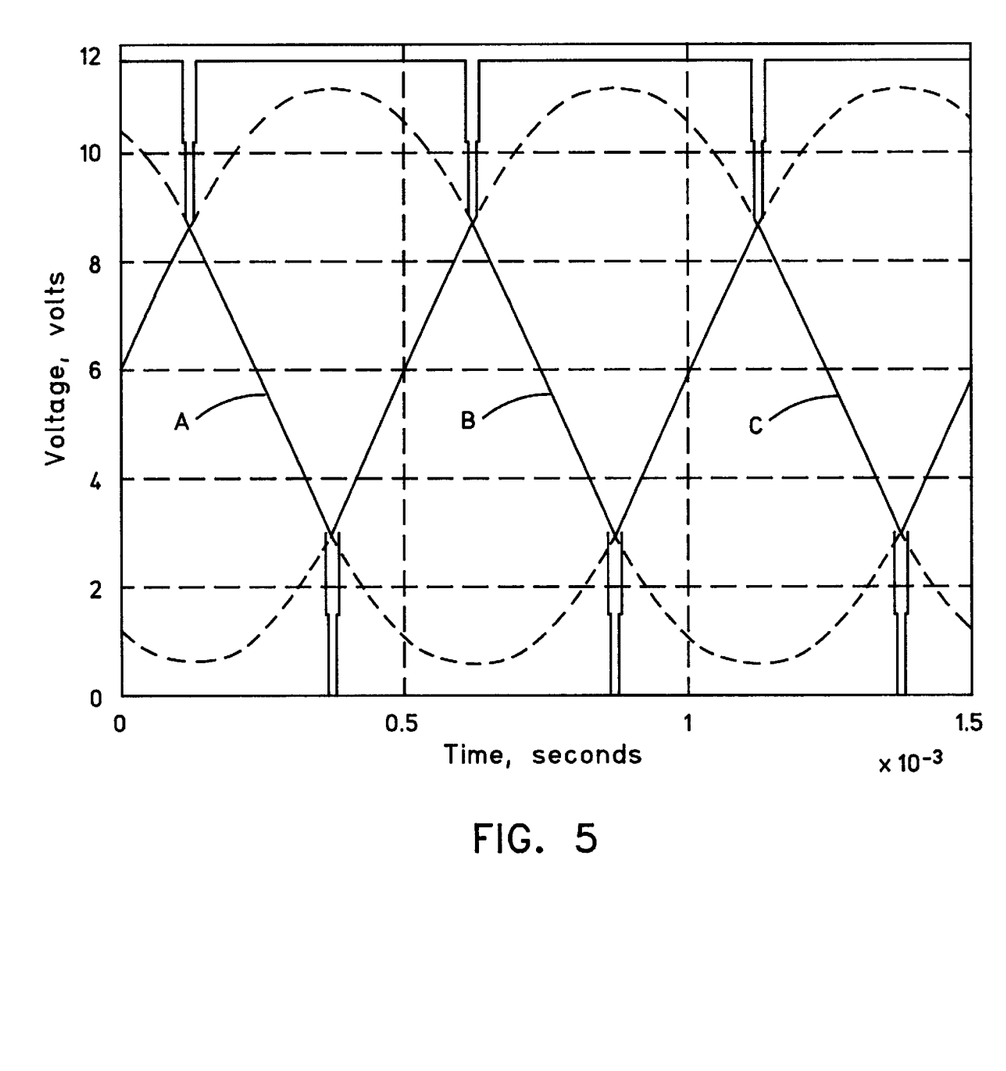
FIG. 5 is a representation of the drive voltage timing for optimal power efficiency of the motor illustrated in FIG. 1.

FIG. 5 shows the BEMF voltage waveforms from terminals on each of the three motor phase windings, generated as the motor turns in the presence of the magnetic fields generated by magnets in the rotor. The FIG. 5 drawing shows one complete electrical cycle; with the eight-pole motor design, there are four electrical cycles per revolution. The solid traces indicate the voltage applied to the three motor phases by the motor output stage. For ease of identification, the phases are labeled A, B, and C. It should be noted that the drive voltage goes high, almost to the supply voltage level of 12.0 volts, over the interval when the BEMF waveforms are at their peak values and extending for sixty electrical degrees on either side of that peak. Likewise, the voltage is driven low over the interval when the BEMF waveforms are at their minimum and for sixty degrees on either side of that low.

When the voltages are not being driven high or low, they are restored to the value of the BEMF sinusoidal traces. The only voltage signal present on a non-driven phase trace in FIG. 5 will be the induced voltage. The dotted trace represents the induced voltage. In FIG. 5, the nominal "zero crossing" point is at approximately 6.0 volts. After the BEMF voltage crosses this point, the commutation point follows by approximately thirty degrees. The commutation point is the point at which one of the three phases is driven high or low, and one of the remaining phases that was previously being driven is no longer driven. It can be seen that the high and low drive intervals are symmetric with respect to the BEMF peaks and minimums. Because these peaks and minimums represent the maximum torque potential, a commutation delay of thirty degrees represents optimal power efficiency. This operational condition is achieved by setting fixed time delay of the control processor to a time interval equal to thirty degrees, which those skilled in the art will understand how to determine without further description.

Figure 6:
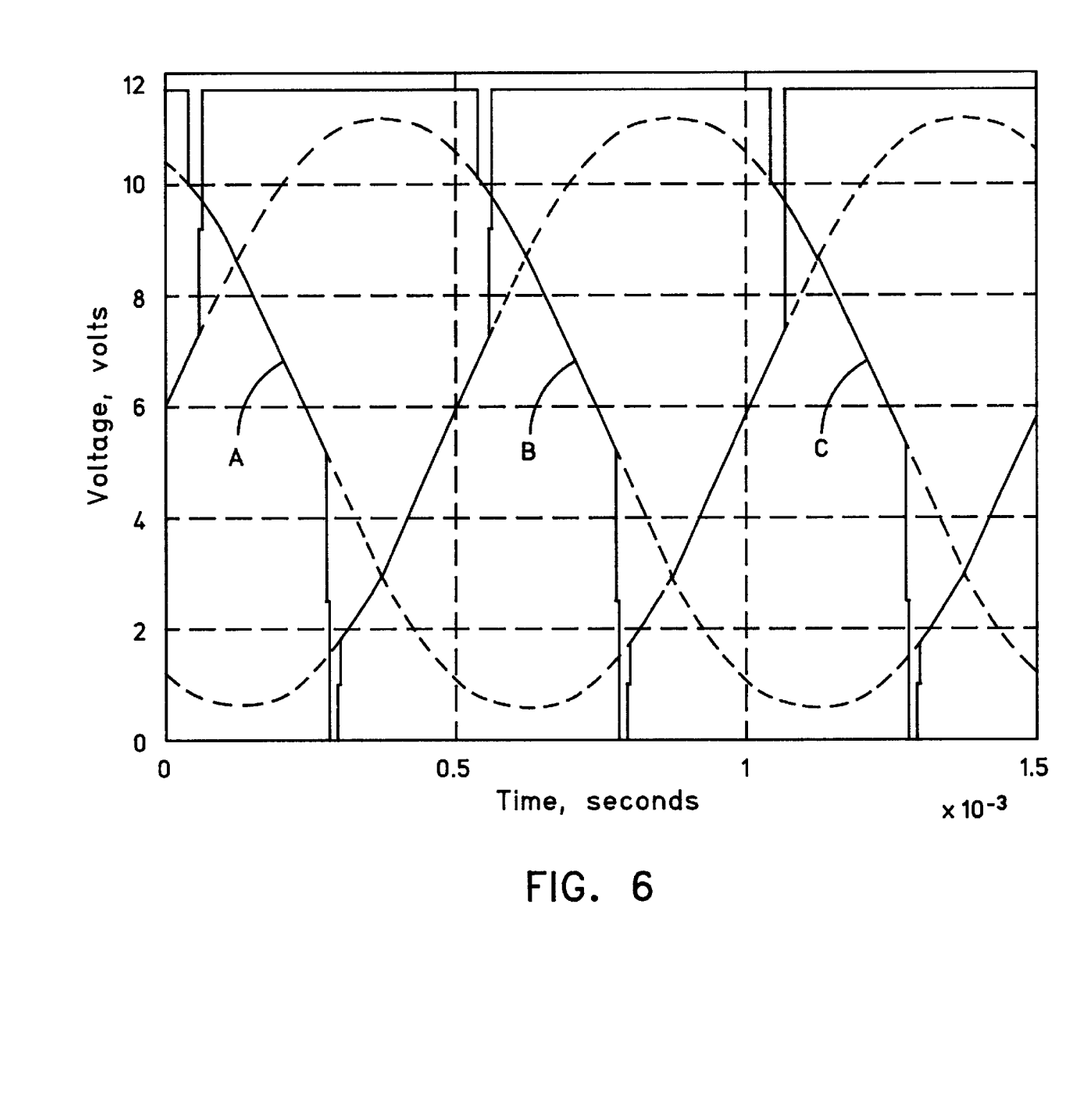
FIG. 6 is a representation of the drive voltage timing for the motor illustrated in FIG. 1 with a twenty-degree phase advance for increased torque.
Figure 7:
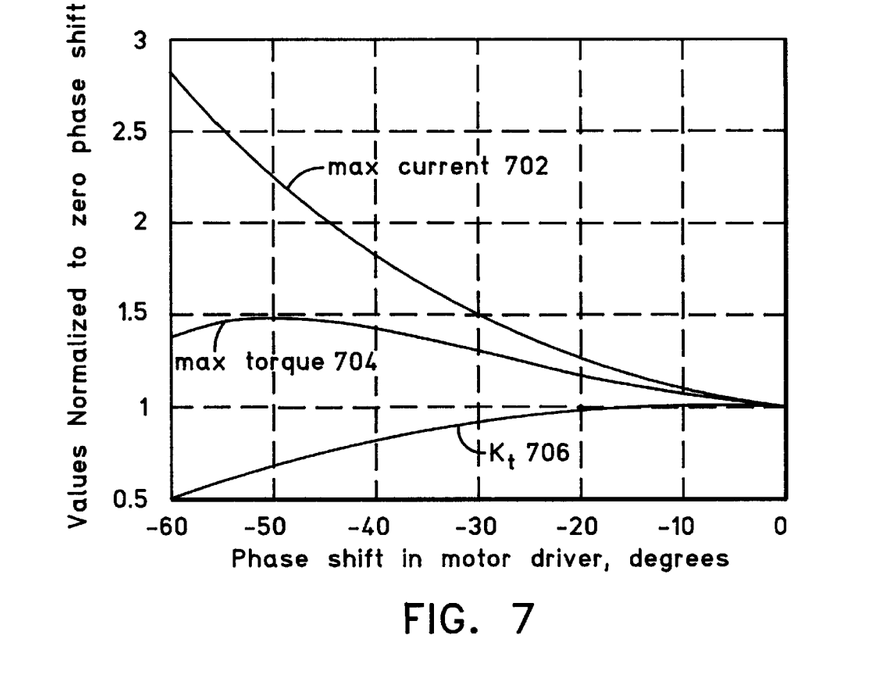
FIG. 7 is a representation of torque constant, maximum motor current, and maximum output torque for the motor of FIG. 1 with varying phase advance, in a ratio with and without phase advance.

FIG. 6 shows the effect of a shorter time delay relative to FIG. 5. Again, the phases are labeled A, B, and C. An altered delay setting can cause the motor to be driven in an "asymmetric" fashion in which the high and low drive intervals no longer are aligned with BEMF peaks and valleys. The result is that the motor has more voltage headroom, even though the supply voltage has not changed. As a result, more current can be provided to the motor. It should be noted that the area between the dotted BEMF traces of FIG. 6 and the solid high-side drive voltages corresponds to the voltage headroom. It also should be noted that the voltage headroom area in FIG. 6 is clearly larger than the corresponding area in FIG. 5. Thus, there is increased voltage headroom. It also may be seen that the average BEMF during the drive portion is less in FIG. 6 than in FIG. 5, so that there is less power efficiency. Thus, the greater current obtained and greater torque produced by using the techniques of the invention have cost some operating efficiency.

FIG. 7 is a representation of the effects of phase advance on the maximum achievable torque and current for the motor illustrated in FIG. 1, and shows how advancing the motor commutation phase can provide more torque, up to a point. The horizontal (x) axis represents commutation phase shift relative to that shown in FIG. 5 (with zero phase shift), in electrical degrees. The vertical (y) axis represents the ratio between various measures. In FIG. 7, the upper curve 702 shows the ratio of maximum motor drive current with a phase shift over the maximum motor drive current with no phase shift. The middle curve 704 shows the maximum output torque ratio with and without phase advance. Finally, the lower curve 706 shows the effective motor torque constant $K_t$ with and without phase shift.

It should be understood that, for steady-state operation, the conventional commutation delay from zero-crossing is approximately thirty electrical degrees. The lower curve 706 of FIG. 7 shows that reducing this delay, or advancing the phase, reduces the effective motor constant $K_t$ and the upper curve 702 shows that advancing the phase provides a greater achievable current, given a constant power supply voltage. In addition to providing for a greater maximum current, the phase advance provides for a faster current rise time in the motor windings. Those skilled in the art will recognize that the rise time is determined by the inductance/resistance time constant of the field windings and by the voltage potential across the windings when the current is ramping up. Driving with a phase advance decreases the rise time by increasing the voltage potential.

Tests were conducted to determine advantages obtained by motor control in accordance with the present invention. The outcome of the tests are shown in FIG. 8, which shows the effects of a three-degrees-Centigrade overnight cold soak on time-to-speed for a disk drive motor with and without the operating techniques of the present invention.

Figure 8:
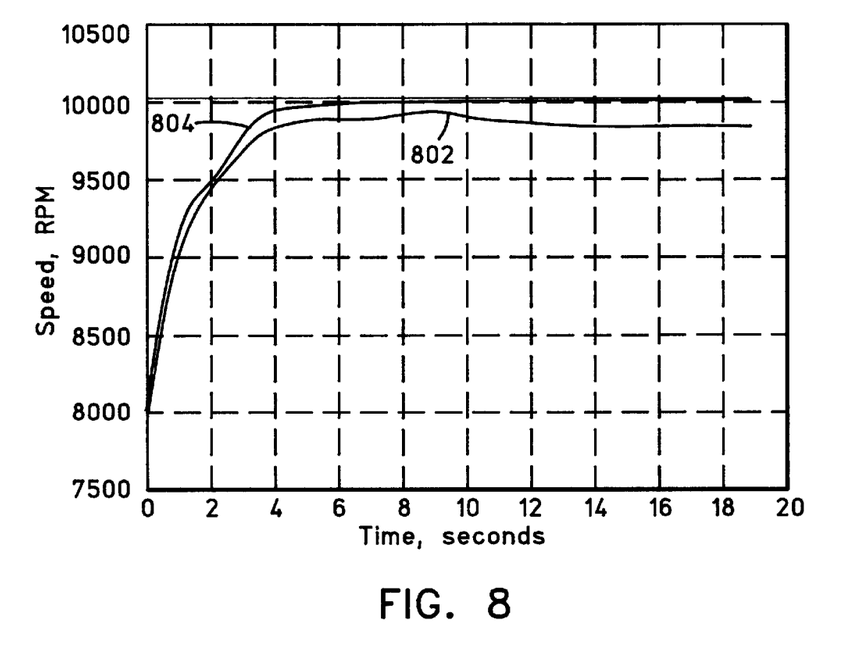
FIG. 8 is a representation of motor speed versus time for the motor of FIG. 1, with and without the phase advance of the present invention, after a cold-soak.

The lower trace 802 of FIG. 8 is for a case in which the commutation advance for the drive was set at 9500 RPM for the optimal run efficiency at 10020 RPM. It should be noted that in this configuration, the disk drive never reaches its nominal operating speed of 10000 RPM. The upper trace 804 of FIG. 8 is for the case in which the commutation advance was set to approximately 10.0 degrees at 9500 RPM, and the advance was retained after reaching the operational speed of 10020 RPM. In the case of this upper curve 804, the drive was operated according to the invention described herein. These results indicate how the phase advance technique improves spin-up time as well as allows for robust speed control in high drag conditions.

Other disk drive motor spin-up techniques can be implemented without departing from the teachings of the present invention. For example, FIG. 9 is a flow diagram of alternative processing steps that can be performed by the control processor 110 of FIG. 1 to implement spin-up control in accordance with the present invention.

Figure 9:
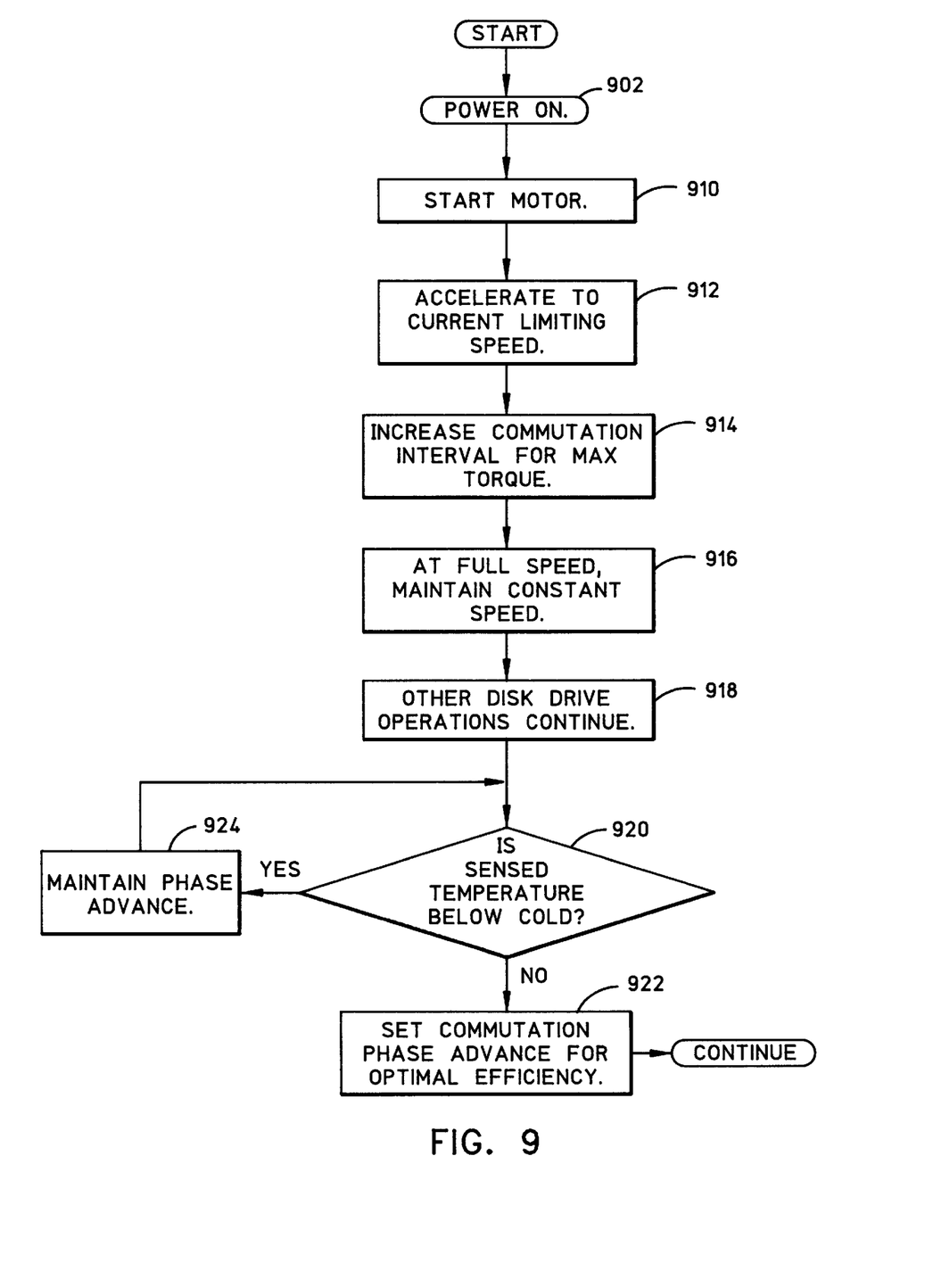
FIG. 9 is a flow diagram that illustrates alternative processing steps executed by the microprocessor of the disk drive system illustrated in FIG. 1.

FIG. 9 shows that, as with the FIG. 4 flow diagram, an initial operating step is performed, as represented by the "power on" operation box 902. For the FIG. 9 embodiment, operation then continues at the flow diagram box numbered 910, which indicates that the motor is started, and then at the flow diagram box numbered 912, where the motor is accelerated to a current-limiting speed. When the current-limiting speed is reached, the control processor begins increasing the commutation phase advance of the drive current to maintain maximum output torque, as represented in FIG. 9 by the flow diagram box numbered 914. Once full operational speed is reached, the closed-loop control mode is entered for constant speed control, represented by the flow diagram box numbered 916. Once closed-loop speed control is in effect, other disk drive operations can continue in parallel with the remainder of the flow diagram steps, as indicated by the flow diagram box numbered 918.

With the conclusion of the acceleration to speed, in the FIG. 9 embodiment, the control processor next determines if there still is a need for generating increased torque, due to a cold environment, by immediately checking the temperature indicated by the motor spindle temperature sensor. This is represented by the decision box numbered 920, which indicates that the control processor checks to determine if the sensed temperature is below a "cold" threshold level. If the sensed temperature was not "cold", a negative outcome at the decision box 920, then the control processor sets the commutation phase advance for the optimal steady-state efficiency and operation continues with closed-loop control at the flow diagram box numbered 922. Other operation of the disk drive can then continue as soon as the target speed is reached. The temperature measurements, waiting for timer expiration, and adjusting commutation delay can be done in parallel with other operations (see box 918). If the sensed temperature was "cold", an affirmative outcome at the decision box 920, then the control processor maintains the acceleration mode commutation phase advance, as indicated by the flow diagram box numbered 924, and processing returns to the decision box 920 to wait for the next temperature measurement and once again poll the temperature sensor. If desired, a time limit or polling limit can be placed on maintaining the acceleration mode, to ensure that the motor does not operate indefinitely in the acceleration mode.

The present invention has been described above in terms of presently preferred embodiments so that an understanding of the present invention can be conveyed. There are, however, many configurations for disk drive motor spin-up control not specifically described herein but with which the present invention is applicable. The present invention should therefore not be seen as limited to the particular embodiments described herein, but rather, it should be understood that the present invention has wide applicability with respect to disk drive motor spin-up control generally. All modifications, variations, or equivalent arrangements and implementations that are within the scope of the attached claims should therefore be considered within the scope of the invention.

We claim:

1. A method of controlling spindle motor spin-up in a disk drive, comprising the method steps of:

detecting environmental temperature at the spindle motor of the disk drive upon spindle motor start;

controlling commutation phase advance to generate substantially maximum torque if the detected environmental temperature indicates that maximum torque is needed; and determining that the maximum torque is no longer needed and, in response, adjusting the commutation phase advance for optimal efficiency during steady-state operation of the spindle motor.

2. A method as defined in claim 1, wherein the step of controlling commutation phase advance comprises the steps of:

generating maximum torque from spindle motor start until the spindle motor reaches an operational speed; and determining if the detected environmental temperature indicates that maximum torque is still needed.

3. A method as defined in claim 1, wherein the step of determining comprises waiting for expiration of a predetermined time interval.

4. A method as defined in claim 3, wherein the predetermined time interval comprises approximately five minutes.

5. A method as defined in claim 1, wherein the step of controlling the commutation phase advance comprises:

accelerating the spindle motor to a current limiting speed; and increasing the phase advance to produce substantially maximum torque from the spindle motor.

6. A method as defined in claim 1, wherein the step of determining comprises repeatedly sensing the environmental temperature and maintaining the phase advance to produce maximum torque while the sensed environmental temperature is below a predetermined threshold.

7. A disk drive system comprising:

a disk drive spindle motor that rotates a storage disk;

a disk drive environmental temperature sensor; and a control processor that receives data from the temperature sensor that indicates environmental temperature at the spindle motor upon motor start, controls commutation phase advance to generate substantially maximum torque if the indicated environmental temperature indicates that maximum torque is needed, and determines when the maximum torque is no longer needed and, in response, adjusts the commutation phase advance for optimal efficiency during steady-state operation of the spindle motor.

8. A disk drive system as defined in claim 7, wherein the control processor controls commutation phase advance by generating maximum torque from spindle motor start until the spindle motor reaches an operational speed and then determining if the detected environmental temperature indicates that maximum torque is still needed.

9. A disk drive system as defined in claim 7, wherein the control processor determines when maximum torque is no longer needed by waiting for expiration of a predetermined time interval.

10. A disk drive system as defined in claim 9, wherein the predetermined time interval comprises approximately five minutes following spindle motor start.

11. A disk drive system as defined in claim 7, wherein the control processor controls the commutation phase advance by accelerating the spindle motor to a current limiting speed and then increasing the phase advance to produce substantially maximum torque from the spindle motor.

12. A disk drive system as defined in claim 7, wherein the control processor determines that maximum torque is no longer needed by repeatedly sensing the environmental temperature and maintaining the phase advance to produce maximum torque while the sensed environmental temperature is below a predetermined threshold.

13. A disk drive control processor comprising:

a central processor unit; and a memory that contains program steps that are executed by the central processor unit such that the program steps implement a decision block for controlling phase advance of a disk drive spindle motor upon spindle motor start, wherein the decision block sets a commutation phase advance to generate substantially maximum torque from the spindle motor, determines if a sensed environmental temperature of the disk drive spindle motor indicates that maximum torque is not needed and, if so, adjusts the commutation phase advance for optimal efficiency during steady-state operation of the spindle motor.

14. A disk drive control processor as defined in claim 13, wherein the decision block controls commutation phase advance by generating maximum torque from spindle motor start until the spindle motor reaches an operational speed and then determining if the detected environmental temperature indicates that maximum torque is still needed.

15. A disk drive control processor as defined in claim 13, wherein the decision block program steps determine when maximum torque is no longer needed by waiting for expiration of a predetermined time interval.

16. A disk drive control processor as defined in claim 15, wherein the predetermined time interval comprises approximately five minutes following spindle motor start.

17. A disk drive control processor as defined in claim 13, wherein the decision block program steps control the commutation phase advance by accelerating the spindle motor to a current limiting speed and then increasing the phase advance to produce substantially maximum torque from the spindle motor.

18. A disk drive control processor as defined in claim 13, wherein the decision block program steps determine that maximum torque is no longer needed by repeatedly sensing the environmental temperature and maintaining the phase advance to produce maximum torque while the sensed environmental temperature is below a predetermined threshold.

19. A method of controlling spindle motor spin-up in a disk drive, comprising the method steps of:

detecting environmental temperature at the spindle motor of the disk drive upon spindle motor start;

controlling commutation phase advance to generate substantially maximum torque upon spindle motor start until the spindle motor reaches an operational speed;

determining if the detected environmental temperature indicates that maximum torque is still needed and, if maximum torque is still needed, waiting for expiration of a predetermined time interval; and adjusting the commutation phase advance for optimal efficiency during steady-state operation of the spindle motor.

20. A method as defined in claim 19, wherein the predetermined time interval comprises approximately five minutes.

21. A method as defined in claim 19, wherein the step of controlling the commutation phase advance comprises:

accelerating the spindle motor to a current limiting speed; and increasing the phase advance to produce substantially maximum torque from the spindle motor.

22. A disk drive system comprising:

a disk drive spindle motor that rotates a storage disk;

disk drive environmental temperature sensor; and a control processor that receives data from the temperature sensor that indicates environmental temperature at the spindle motor upon motor start, controls commutation phase advance to generate substantially maximum torque upon spindle motor start until the spindle motor reaches an operational speed, determines if the detected environmental temperature indicates that maximum torque is still needed and, if maximum torque is still needed, waits for expiration of a predetermined time interval, and adjusts the commutation phase advance for optimal efficiency during steady-state operation of the spindle motor.

23. A disk drive system as defined in claim 22, wherein the predetermined time interval comprises approximately five minutes following spindle motor start.

24. A disk drive system as defined in claim 23, wherein the control processor controls the commutation phase advance by accelerating the spindle motor to a current limiting speed and then increasing the phase advance to produce substantially maximum torque from the spindle motor.

* * * * *

UNITED STATES PATENT AND TRADEMARK OFFICE
CERTIFICATE OF CORRECTION

PATENT NO. : 6,078,158
DATED : June 20, 2000
INVENTOR(S) : S. E. Heeren et al.

It is certified that error appears in the above-identified patent and that said Letters Patent is hereby corrected as shown below:

<u>Claims, column 12,</u>
Line 25, delete "controlling phase" and insert -- controlling commutation phase --.

Signed and Sealed this

Eighteenth Day of September, 2001

Attest:

NICHOLAS P. GODICI
*Acting Director of the United States Patent and Trademark Office*

*Attesting Officer*